United States Patent [19]

Hass et al.

[11] 4,347,227
[45] Aug. 31, 1982

[54] PROCESS FOR REMOVING $SO_x$ AND $NO_x$ COMPOUNDS FROM GAS STREAMS

[75] Inventors: Robert H. Hass, Fullerton; Walter Albertson, Brea, both of Calif.

[73] Assignee: Union Oil Company of California, Los Angeles, Calif.

[21] Appl. No.: 283,183

[22] Filed: Jul. 14, 1981

Related U.S. Application Data

[63] Continuation-in-part of Ser. No. 242,611, Mar. 11, 1981.

[51] Int. Cl.$^3$ .............................................. B01D 53/34
[52] U.S. Cl. ................................. 423/235; 423/243; 423/567; 210/683; 210/903
[58] Field of Search .............. 423/235, 242, 243, 351, 423/567; 210/683, 903

[56] References Cited

U.S. PATENT DOCUMENTS

| | | | |
|---|---|---|---|
| 2,142,987 | 1/1939 | Bacon et al. | 423/243 X |
| 2,664,441 | 12/1953 | Owens et al. | 210/377.3 |
| 2,697,725 | 12/1954 | Bryce | 210/37 |
| 2,729,543 | 1/1956 | Keller | 423/242 |
| 3,397,963 | 8/1968 | Wagner | 423/569 |
| 3,584,042 | 6/1971 | Yavorsky et al. | 423/242 X |
| 3,592,850 | 7/1971 | Mazzocco et al. | 423/243 X |
| 3,687,614 | 8/1972 | Yavorsky et al. | 423/243 |
| 3,687,615 | 8/1972 | Gorin et al. | 423/242 |
| 3,928,537 | 12/1975 | Saitoh et al. | 423/242 |
| 3,961,034 | 6/1976 | Bostian et al. | 423/181 |
| 3,984,522 | 10/1976 | Saito et al. | 423/235 |
| 4,013,430 | 3/1977 | Adachi et al. | 55/37 |
| 4,055,623 | 10/1977 | Saitoh et al. | 423/235 |
| 4,071,602 | 1/1978 | Pearce | 423/243 |
| 4,083,944 | 4/1978 | Chalmers | 423/567 A |
| 4,177,140 | 12/1979 | Smakman | 210/683 |
| 4,222,591 | 9/1980 | Hass | 423/235 |

FOREIGN PATENT DOCUMENTS

| | | | |
|---|---|---|---|
| 2350962 | 4/1974 | Fed. Rep. of Germany | 210/903 |
| 50-18348 | 2/1975 | Japan | 423/235 |
| 51-109280 | 9/1976 | Japan | 423/235 |

OTHER PUBLICATIONS

"Reactions with Addition Compounds Containing Activated Formic Acid", Published in Augwandte Chemie, International Edition in English, Wagner, vol. 9, 1970, pp. 50-54.
"Amber-Hi-Lites", Special Issue, Jan. 1971, Rohm & Haas Co. 7 pages.
"Amberlite IRA-47", May 1970, Rohm & Haas Co.
$NO_x$ Abatement for Stationary Sources in Japan", EPA-600/7-77-103b, Sep. 1977.
"Potassium Formate Process for Removing $SO_2$ from Stack Gas", (Sep. 1970), Yavorsky et al., Environmental Science & Technology, vol. 4, No. 9, pp. 757-765.
"Absorption of Nitric Oxide by Ferrous Sulfate", by Ganz et al. in the Journal of Applied Chemistry of the U.S.S.R., vol. 26, No. 10, (Oct. 1953), pp. 927-935.
"Microdetermination of Nitrates and Nitrites-III", by Awad et al. in Talanta, vol. 18, No. 7, (1971), pp. 219-224.

*Primary Examiner*—G. O. Peters
*Attorney, Agent, or Firm*—Gregory F. Wirzbicki; Dean Sandford

[57] ABSTRACT

A gas stream containing $SO_x$ and $NO_x$ compounds is first treated for $SO_x$ removal by absorbing the $SO_x$ components in an aqueous liquid absorbent comprising formic or oxalic acid and an alkanolamine containing a tertiary amine functional group. When spent, this absorbent is regenerated by subjection to an elevated temperature sufficient to produce sulfur and/or hydrogen sulfide. The $SO_x$-purified gas recovered from the first absorption step is then treated for $NO_x$ removal by contact with a second liquid absorbent solution containing a ferrous chelate in an aqueous, acidic medium. This absorbent is regenerated by contact, under conditions of elevated temperature and pressure, and in the presence of added formate ion, with a catalyst comprising a water-insoluble substance containing one or more tertiary amine functional groups such that absorbed $NO_x$ components are converted to elemental nitrogen.

41 Claims, 1 Drawing Figure

PROCESS FOR REMOVING $SO_x$ AND $NO_x$ COMPOUNDS FROM GAS STREAMS

CROSS-REFERENCE TO RELATED APPLICATIONS

This patent application is a continuation-in-part of copending application Ser. No. 242,611, filed Mar. 11, 1981.

BACKGROUND OF THE INVENTION

This invention relates to the removal of $SO_x$ and $NO_x$ compounds from waste gas streams. More particularly, the invention relates to the removal of $SO_2$, $SO_3$, NO, and $NO_2$ from industrial stack gases.

The burning of coal or oil as fuel in a boiler or furnace produces a flue gas (or stack gas) usually containing $SO_2$, $SO_3$, and $NO_x$. The concentration of these components in a particular stack gas depends upon such factors as the concentration of sulfur and nitrogen components in the fuel, the metals concentration in the fuel, the air rate fed to the boiler or furnace, and the temperature of combustion. A stack gas, however, will usually contain between about 10 and 2000 ppmv $NO_x$ and between about 100 ppmv and 5 mole percent $SO_x$ compounds, with the large majority of the latter, usually at least about 95% thereof, being in the form of $SO_2$.

Before a stack gas containing $SO_x$ compounds may be discharged to the atmosphere, many environmental regulatory agencies require that the stack gas be desulfurized, that is, that the concentration of sulfur compounds therein be reduced to specified levels. Similar regulations require the removal of $NO_x$ components in stack gas, largely for the reason that such components contribute to photochemical smog.

The most conventional method presently utilized to remove $SO_x$ compounds from a stack gas involves contacting the stack gas with a liquid absorbent containing dissolved lime or caustic. But although such a process is favorable from a cost standpoint, it is largely ineffective for removing NO, which might also be present in the stack gas. In addition, since the spent absorbent obtained from a lime or caustic treatment is regenerable only by extremely costly techniques, the spent absorbent is usually not regenerated; instead, it is allowed to accumulate for waste disposal, which requires in many instances the daily handling of tons of spent absorbent. Thus, waste disposal of spent absorbent is a nuisance at the least and oftentimes a very difficult task.

Accordingly, it is an object of the invention to provide a process for removing both $SO_x$ and $NO_x$ components from gas streams while minimizing the amount of waste products produced. It is an especial object of the invention to provide a highly efficient process for removing $SO_2$ and NO from stack gas streams and converting the removed $SO_2$ and NO components to elemental sulfur and elemental nitrogen, respectively. These and other objects and advantages will become more apparent in view of the following description of the invention.

SUMMARY OF THE INVENTION

According to this invention, a feed gas stream comprising $SO_x$ and $NO_x$ components is introduced into a first absorption zone wherein, by contact with a liquid absorbent comprising the reaction product of formic or oxalic acid and an alkanolamine containing a tertiary amine functional group, $SO_x$ components are absorbed into the absorbent, thereby producing a $SO_x$-purified gas stream still containing $NO_x$ components. This gas stream is then passed to a second absorption zone wherein, by contact with a liquid absorbent comprising a chelate of a metal-containing cation, such as ferrous ion chelated with ethylenediaminetetraacetic acid, $NO_x$ components are absorbed into the absorbent, thereby producing a product gas of reduced $SO_x$ and $NO_x$ content in comparison to the feed gas stream.

Provision is made in the invention for regenerating the spent absorbent recovered from the first absorption zone to a form once again active for removing $SO_x$ compounds. This may be accomplished by adding formic acid or oxalic acid to the spent absorbent and then heating the spent absorbent, now containing added formate or oxalate ion and usually having an acid pH, in a regeneration vessel to a temperature such that the dissolved $SO_2$ is converted to $H_2S$. Depending upon the temperature the spent absorbent is heated to, the dissolved $SO_2$ may be converted completely to $H_2S$ or only partially so, with increasing temperatures yielding higher conversions to $H_2S$. Thus, in one embodiment of the invention, the $SO_2$ is essentially completely converted to $H_2S$, and the $H_2S$ is first separated from the spent absorbent in the regeneration vessel and then converted to elemental sulfur in facilities separate therefrom. Alternatively and more preferably, the temperatures of the regeneration vessel is controlled so that the dissolved $SO_2$ is converted to elemental sulfur, perhaps in part by the aqueous Claus reaction:

$$SO_2 + 2H_2S \rightarrow 3S + 2H_2O \qquad (I)$$

Provision is also made in the invention to regenerate the absorbent solution utilized to remove the $NO_x$ compounds in the second absorption zone. Spent absorbent recovered from the second absorption zone is contacted, under acidic conditions and at elevated temperature and pressure, and in the presence of added formate ion, with a water-insoluble substance containing one or more tertiary amine functional groups. One such substance is an organic anion exchange resin containing tertiary amine functional groups. Such resins are highly effective for catalytically promoting the conversion of dissolved $NO_x$ components to elemental nitrogen, especially when they have been ion-exchanged to contain formate ions in a substantial proportion of the ion exchange sites.

In an alternative embodiment of the invention, the absorbent utilized to remove $NO_x$ compounds comprises a metal chelate effective for absorbing $NO_x$ compounds plus the reaction product of formic or oxalic acid and an alkanolamine containing a tertiary amine functional group. Regeneration is accomplished by subjecting spent absorbent to an elevated temperature in the presence of added formate or oxalate ion, usually in the form of formic or oxalic acid, respectively.

As used herein, the term "absorbent" refers to the aqueous media used in the process to remove $SO_x$ and $NO_x$ from feed gases, regardless of the particular mechanism and/or mechanisms by which the $SO_x$ and $NO_x$ compounds are removed from the feed gas and retained by the absorbent. Also the term "$SO_x$" refers to $SO_2$ and $SO_3$ and "$NO_x$" to NO and $NO_2$.

DETAILED DESCRIPTION OF THE INVENTION

Gas streams suitable for treatment by the process of this invention are those containing $SO_x$ and $NO_x$ compounds. Preferred gas streams for treatment herein contain at least some $SO_2$, most preferably in concentrations exceeding 500 ppmv, and the most preferred gas stream contains $SO_2$ and virtually no $SO_3$. The invention is particularly suited to treating particulate-free stack gas streams for $SO_2$ and NO removal. A typical stack gas obtained by the combustion of a sulfur-containing fossil fuel contains the several gaseous components listed in Table I in the ranges of concentration shown.

TABLE I

| Component | Mol % | Component | ppmv |
|---|---|---|---|
| $O_2$ | 1–5 | CO | 0–500 |
| $CO_2$ | 10–20 | $NO_x$ | 10–2000 |
| $H_2O$[1] | 5–25 | $SO_2$ | 100–50,000 |
| $N_2$ | 70–75 | $SO_3$ | 0–200 |

[1]Note:
All gas stream compositions in the tables hereinafter are reported on a water-free (dry) basis.

The preferred embodiment of the invention will now be described in detail, with attention first being directed to removing $SO_x$ and then to removing $NO_x$.

$SO_x$ REMOVAL

Figure 1:
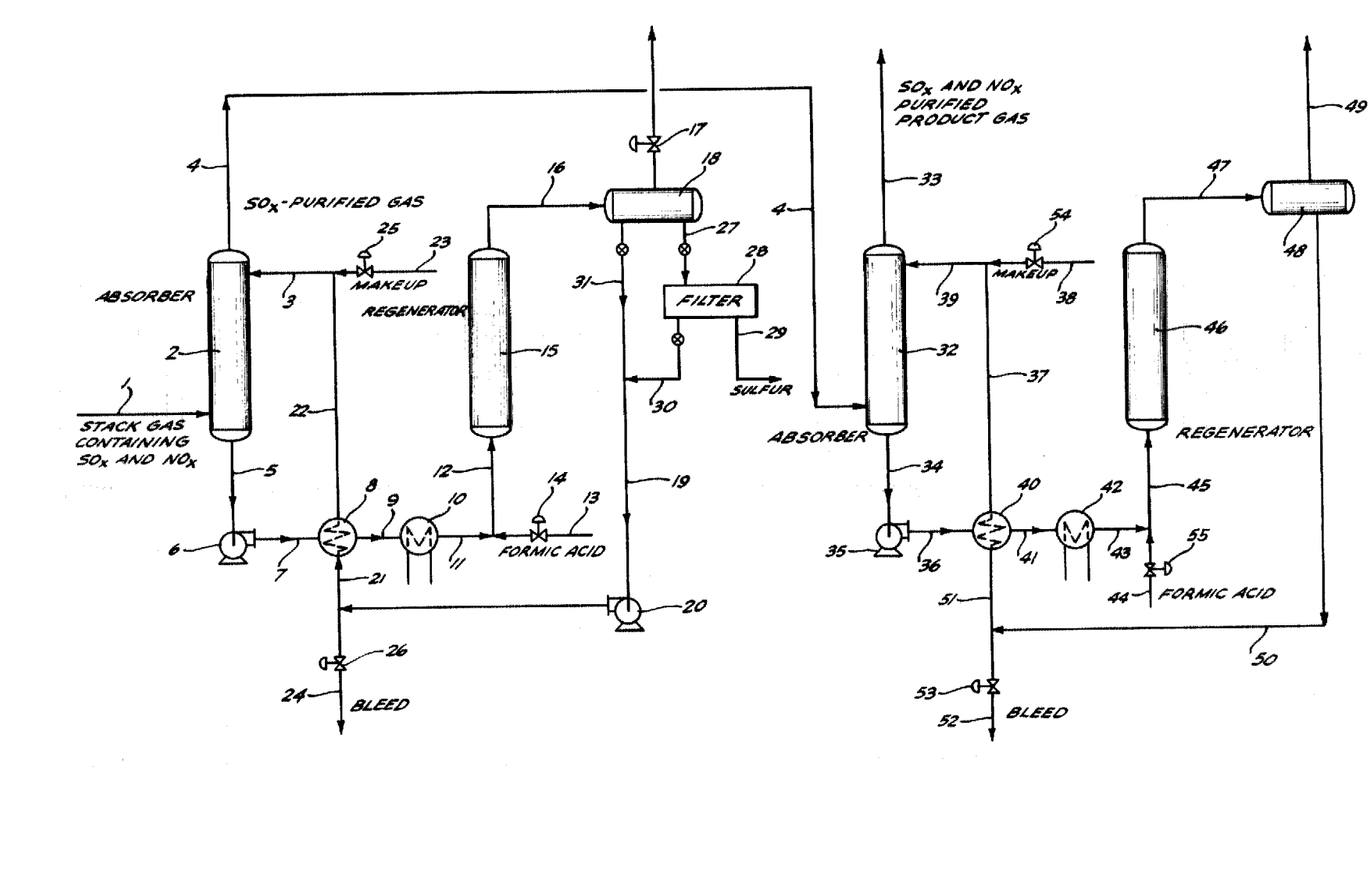
The drawing is a schematic flowsheet of the process of the invention for removing $SO_x$ and $NO_x$ compounds from a stack gas or other gas stream. For simplicity and ease of understanding, such conventional devices as pressure relief valves, temperature controllers, and back pressure regulators have not been represented in the drawing.

Referring now to the drawing, a particulate-free but $SO_x$- and $NO_x$-containing stack gas of the kind shown in Table I (but preferably only containing trace proportions of $SO_3$, i.e., less than about 10 ppmv) is fed by line 1 at a convenient temperature, usually less than about 200° F., preferably less than 160° F., and at a rate between about 1000 scf/hr and about 100,000 scf/hr and at a pressure slightly above atmospheric but preferably less than about 15 psig into absorber 2. The absorber may comprise such suitable gas-liquid absorption equipment as a packed tower, a multi-plate column, or a venturi scrubber, but the design should be such that sufficient contact time is provided for the $SO_x$ components to fully dissolve in the fresh absorbent introduced through line 3 and make-up line 23. Preferably, the absorber is of a packed tower design, and the stack gas is passed countercurrently to the flow of the absorbent. An essentially $SO_x$-free and desulfurized gas is discharged by line 4 and subsequently treated for $NO_x$ removal while spent absorbent containing dissolved $SO_x$ compounds is withdrawn via conduit 5.

The fresh absorbent feed into absorber 2 via lines 3 and 23 may be prepared by dissolving formic acid or oxalic acid and one or more alkanolamines containing a tertiary amine functional group into an aqueous medium. The preferred absorbent herein may be characterized as an aqueous solution containing the reaction product of formic acid (or formate ion in an acid environment) and an alkanolamine containing a tertiary amine functional group. The more suitable alkanolamines for use in the invention boil above 300° F. at atmospheric pressure, and the most useful alkanolamines are of the formula:

where R is an alkyl or alkanol group containing at least 1 carbon atom, preferably between 1 and 10, and where R' and R'' are alkyl groups containing at least 2 carbon atoms, although not necessarily an equal number of carbon atoms, with the preferred number of carbon atoms in R' and R'' being between about 2 and 10. The alkanolamine is most preferably selected from the group consisting of methyldiethanolamine, triethanolamine, and triisopropanolamine. These amines and other alkanolamines of the chemical formula set forth above have an advantage in that they have relatively high boiling points, usually above about 400° F. at atmospheric pressure, and thus may safely be used in absorber 2 without fear of releasing substantial quantities of the amine to the atmosphere with the $SO_x$-purified gas released through line 4. In addition, these amines are nontoxic and may be safely handled.

Usually, the amounts of the alkanolamine and formic acid are such that the resulting absorbent composition is effective for absorbing $SO_x$ compounds and has a pH between about 2.5 and 6.5, preferably 3.0 and 4.0. A preferred composition for the fresh absorbent entering the absorber comprises an aqueous solution containing the alkanolamine in a 0.5 to 5.0 molar concentration and sufficient formic acid to produce a pH in the 3.0 to 4.0 range. A still more highly preferred absorbent composition consists essentially of the alkanolamine in a 1.0 to 3.0 molar concentration and sufficient formic acid to maintain the pH between 3.0 and 4.0, and most preferably 3.5 to 4.0. Typical absorbent compositions contain 2 to 4 moles of formic acid per mole of alkanolamine, and preferably 3 moles of formic acid per mole of alkanolamine.

The absorbent compositions used in the invention preferably consist essentially of water, formic acid, and one or more alkanolamines. In alternative embodiments of the invention, however, other ingredients may be present in the absorbent composition. For example, a water-soluble salt of formic acid, such as sodium formate, may be included in the absorbent composition to take advantage of the buffering effect such salts provide in the relatively low pH ranges of 3.0 to 5.0. The most useful salts to be added to impart buffering properties to the absorbent composition are sodium formate, potassium formate, and ammonium formate.

Although the invention is not intended to be limited to any particular theory of operation, it is believed that the chemical reactions occurring in the absorber between the gaseous components in a stack gas of composition shown in Table I and the components of the aqueous absorbent include the following:

(II)

(III)

(IV)

(V)

When the absorber is operated under preferred conditions, the flow rate of the absorbent fed via line 3 is so correlated with the amount of $SO_x$ removed from the stack gas that spent absorbent is withdrawn from absorber 2 via conduit 5 at a pH no lower than 1.0 to 1.5 units below that of the fresh absorbent. Usually, since the absorbent utilized in the preferred embodiment has an acid pH, the pH of the spent absorbent will, in the preferred embodiment, also have an acid pH, a feature which avoids the withdrawal of a spent absorbent from absorber 2 rich in $CO_2$ removed from the stack gas by dissolution.

In the preferred embodiment of the invention, the spent absorbent removed by line 5 will usually be at a temperature below about 160° F. and have a pH only slightly below that of the fresh absorbent, usually no more than about 1.0 to 1.5 pH units lower. Thus, if the fresh absorbent has a pH of 4.0, the flow rate of the absorbent fed via line 3 is so correlated with the amount of $SO_x$ removed from the stack gas that the spent absorbent is withdrawn at a pH no lower than about 2.5 to 3.0.

The spent absorbent in line 5 must be regenerated before being recycled to absorber 2 through line 3. However, in order to regenerate the spent absorbent in accordance with the invention, it is first heated to an elevated temperature, usually between about 175° and 400° F., and preferably between 175° and 350° F., and most preferably to a temperature between 180° and 300° F. Thus, the absorbent in line 5 is directed by pump 6 through pipe 7 to heat exchanger 8 and heated by indirect heat exchange with heated, regenerated absorbent. The absorbent is then introduced by conduit 9 into a second preheater 10, wherefrom heated absorbent is obtained in line 11 at a temperature of at least 175° F., and most preferably at a temperature of about 180° to 300° F. To the heated absorbent is added an aqueous solution containing dissolved formic acid through line 13 and valve 14. The resulting mixture in pipe 12 is then fed into regenerator 15.

In regenerator 15, the spent absorbent solution, now containing added formate ion from the formic acid, is regenerated back to its active form by subjecting the solution to a temperature in the range of 175° to 350° F. and a pressure at least sufficient to prevent the absorbent from boiling. When subjected to the foregoing temperature and pressure conditions for a residence time between, for example, 0.5 and 50 hours, usually 1 to 35 hours, and preferably 2 to 10 hours, the absorbent laden with dissolved $SO_2$ and $SO_3$ is regenerated, yielding elemental sulfur and/or hydrogen sulfide, with elemental sulfur being the predominant product when regeneration temperatures between 175° and 210° F. are utilized and hydrogen sulfide being the predominant product at temperatures between 210° and 350° F., especially at temperatures above 275° F., such as 280° to 300° F. Chemical reactions believed to occur in regenerator 15 when elemental sulfur is produced are:

$$8SO_4{}^{-2} + 24HCO_2H \rightarrow S_8 + 24CO_2 + 16H_2O + 16OH^- \tag{VI}$$

$$8SO_3{}^{-2} + S_8 \rightarrow 8S_2O_3{}^{-2} \tag{VII}$$

$$4S_2O_3{}^{-2} + 8HCO_2H \rightarrow S_8 + 8CO_2 + 4H_2O + 8OH^- \tag{VIII}$$

$$8SO_3{}^{-2} + 16HCO_2H \rightarrow S_8 + 16CO_2 + 8H_2O + 16OH^- \tag{IX}$$

$$H^+ + OH^- \rightarrow H_2O \tag{X}$$

Chemical reactions believed to occur in regenerator 15 when hydrogen sulfide is produced are:

$$2H^+ + SO_3{}^{-2} + 3HCO_2H \rightarrow H_2S + 3CO_2 + 3H_2O \tag{XI}$$

$$H^+ + HSO_3{}^- + 3HCO_2H \rightarrow H_2S + 3CO_2 + 3H_2O \tag{XII}$$

$$2H^+ + S_2O_3{}^{-2} + 4HCO_2H \rightarrow 2H_2S + 4CO_2 + 3H_2O \tag{XIII}$$

Yet other reactions occurring in regenerator 15 may include:

$$O_2(aq) + 2HCO_2H \rightarrow 2CO_2 + 2H_2O \tag{XIV}$$

$$S_8 + 8HCO_2H \rightarrow 8H_2S + 8CO_2 \tag{XV}$$

Conditions known to favor the formation of elemental sulfur are: 198° F., 28.6 hours residence time, and 14.7 psia, and among those believed to favor the formation of hydrogen sulfide are: 252° F., 28.6 hours residence time, and 31 to 35 psia.

When preferred conditions are utilized in regenerator 15, the effluent in line 16 will be a two-phase fluid or a three-phase material comprising a non-condensable gas phase and a liquid phase of regenerated absorbent and, if sulfur is produced, a solid phase of rhombic sulfur. If the effluent is two-phase, it is directed to a gas-liquid separator 18, where a regenerated absorbent at a pH between about 2.5 and 6.0, preferably 3.5 to 4.0, is separated from the non-condensable gases and withdrawn through line 31. The non-condensable gases discharged through vent valve 17 contain a large proportion of $CO_2$, usually in a concentration of 60 to 98% by volume (dry basis), with the remainder of the gases comprising hydrogen, hydrogen, sulfide, water vapor, nitrogen, and trace organosulfur gases. The non-condensable gases are preferably directed to sulfur recovery facilities (not shown in the drawing) wherein the $H_2S$ is converted to sulfur or $SO_2$, as by catalytically reacting the $H_2S$ with oxygen at a temperature above about 275° F., preferably above 300° F., in the presence of a catalyst comprising vanadium oxide or vanadium oxide plus bismuth oxide on silica-alumina (or other porous refractory oxide). More detailed disclosures relating to the catalytic conversion of $H_2O$ to sulfur or $SO_2$ may be found in the U.S. Pat. No. 4,123,507 herein incorporated by reference.

In the event a three-phase material is recovered from the regenerator, the foregoing described method is altered such that, after removal of the gas phase in separator 18, the remaining two-phase slurry comprising regenerated absorbent and solid sulfur is directed by line 27 to filtration zone 28 wherefrom elemental sulfur is recovered by line 29 and regenerated absorbent by line 30.

The regenerated absorbent recovered from either line 30 or 31 is directed by line 19 and pump 20 and conduit 21 to heat exchanger 8 and thence to absorber 2 via lines 22 and 3. Eventually, steady state conditions will be attained, and the fresh absorbent feed from make-up line 23 is either shut-off or reduced as required by operating control valve 25. Line 24 and control valve 26 are provided to bleed absorbent from the system as required.

Under steady state conditions, the regeneration of the absorbent is controlled largely by the amount of formic acid added via line 13 and the temperature maintained in regenerator 15. Formic acid is preferably added at a rate at least sufficient to effect full conversion of dissolved SO₂ components (largely in the form of sulfite or bisulfite ion) to H₂S or elemental sulfur as desired according to:

$$3HCO_2H + SO_2 \rightarrow H_2S + 3CO_2 + 2H_2O \quad (XVI)$$

$$2HCO_2H + SO_2 \rightarrow S + 2CO_2 + 2H_2O \quad (XVII)$$

As should be apparent from the foregoing reactions, more formic acid is required for the conversion of SO₂ to hydrogen sulfide than to sulfur. And because higher temperatures are required for the conversion of dissolved SO₂ to hydrogen sulfide than to elemental sulfur, it can be seen that higher operating temperatures in regenerator 15 will require more formic acid addition through line 13 than will lower operating temperatures.

Under steady state conditions, the chemical composition of the regenerated absorbent in line 22 will contain not only the components originally added via make-up line 23, but also residual sulfur-containing anions, particularly sulfate anions. The concentration of these sulfur-containing anions will increase dramatically when conditions are maintained in regenerator 15 that do not result in high conversions of dissolved SO₂ to H₂S or, more preferably, to sulfur or H₂S plus sulfur. Even under preferred conditions, however, some sulfur-containing anions, and particularly sulfate anions, will increase in concentration in the circulating absorbent. Although extremely high conversions (usually exceeding 95%) of dissolved sulfite, bisulfite, and thiosulfate ions to hydrogen sulfide take place in regenerator 15, it has also been found that sulfate ions (formed, for example, by the direct dissolution of SO₃ or by the reaction of dissolved SO₂ with dissolved oxygen) prove exceptionally difficult to reduce in regenerator 15, and it is believed severe conditions are required, such as temperatures above 300° F., to effect high conversions of sulfate ion to hydrogen sulfide. Thus, unless severe conditions are resorted to, a bleed through line 24 will usually be necessary to avoid exceeding the solubility limit of sulfate salts in the circulating absorbent. It has, however, been found that a sulfate concentration as high as 10 g/l can be tolerated in the circulating absorbent without encountering difficulties.

The process as described is highly efficient when preferred conditions are utilized throughout. For a stack gas containing about 2000 vppm SO₂, the desulfurized purified gas discharged via line 4 typically contains less than 300 vppm of SO₂. The desulfurized purified gas typically will carry, on a mass per hour basis, less than 15% of the amount of SO₂ carried in the stack gas. Also in the preferred embodiment, the conversion of dissolved SO$_x$ components to sulfur and/or hydrogen sulfide in regenerator 15 will be at least 80%, usually at least about 90%, of the rate at which SO₂ is absorbed in absorber 2.

The following two Examples illustrate the performance of the invention for treating a SO$_x$-containing stack gas so as to produce elemental sulfur and a SO$_x$-purified gas. All Examples herein are illustrative only and are not intended to limit the scope of the invention, which is defined by the claims.

EXAMPLE I

A simulated stack gas stream having the composition shown in Table II was passed at a pressure slightly greater than atmospheric into a laboratory-sized absorber at the rate of 1000 scc/min (scc referring herein to the calculated volumetric gas rate at 1 atm. and 60° F.). The internal dimensions of the absorber were 2.0 inches I.D. by 3 feet, thereby providing a 1853 cc absorption zone, of which about 741 cc was occupied with ¼ inch ceramic Berl saddles. The absorber was operated at a temperature of about 130° F., and the simulated stack gas was passed upwardly in countercurrent flow with an aqueous liquid absorbent passing through the absorber at 70 ml/hr. The absorbent initially had a pH between 3.3 and 3.5 and consisted essentially of an aqueous solution of formic acid in a 6.0 molar concentration and methyldiethanolamine in a 2.0 molar concentration.

Spent absorbent recovered from the absorber was passed into a regenerator comprising a stirred reactor vessel. The volume of the reactor was approximately 2.0 liters, and the operating conditions maintained therein were 198° F. and atmospheric pressure. Concentrated formic acid (98% by weight) was continually added at the rate of 0.40 ml/hr to the spent absorbent solution entering the regenerator. To the bottom of the regenerator, connected by a rubber hose, was a sample bottle for collecting sulfur produced in the regenerator. Means were also provided to recover a product gas comprising the non-condensable gases produced in the regenerator. This regenerator product gas was recovered at a rate of about 2.7 scc/min while regenerated absorbent was recovered and blended with sufficient water to recycle a stream of regenerated absorbent to the absorber at a rate of 70 ml/hr. Make-up water was added to the absorber as necessary to balance the amount of water that was lost due to evaporation.

The above-described experiment was performed over a 210.5 hour time period, and many representative samples of both the SO$_x$-purified gas stream recovered from the absorber and the regenerator product gas stream recovered from the regenerator were taken between the 116th and 210th hours of the experiment and analyzed, with average results pertaining to these gas streams being shown in Table II. As evidenced by the data in Table II, approximately 89% of the SO₂ in the stack gas was removed by absorption into the liquid absorbent. In addition, samples of the absorbent solution at steady state conditions were taken and analyzed, and it was found that the absorbent had a pH of about 3.5 as it entered the absorber and about 3.3 when it left. The steady state sulfite concentration of the absorbent entering the regenerator was 1.8 g/l (calculated as SO₃⁻²) and less than 0.1 g/l while leaving. The sulfate concentration was about 5.0 g/l (calculated as SO₄⁻²) as the absorbent entered the regenerator and 1.9 g/l as it left and was increasing in the system at an average rate of 0.01 g/l per hour.

Based on the foregoing, it was concluded that the conversion of dissolved SO₂ in the absorbent as it passed through the regenerator was as follows: as 89.2% conversion to sulfur (later determined to be essentially pure rhombic sulfur), 9.4% conversion to sulfate ions, and a 1.4% conversion to H₂S.

TABLE II

| | GAS STREAM COMPOSITIONS | | |
|---|---|---|---|
| Gas Component | Simulated Stack Gas | SO$_x$-Purified Gas | Regenerator Product Gas |
| SO₂, vppm | 2140 | 240 | 120 |
| O₂, vol. % | 3.4 | 3.40 | — |
| CO₂, vol. % | 14.0 | 13.92 | 96.145 |
| N₂, vol. % | 82.39 | 82.66 | 1.875 |

TABLE II-continued

| | GAS STREAM COMPOSITIONS | | |
|---|---|---|---|
| Gas Component | Simulated Stack Gas | SO$_x$-Purified Gas | Regenerator Product Gas |
| H$_2$S, vol. % | — | — | 1.039 |
| H$_2$, vol. % | — | — | 0 |
| CH$_4$, vol. % | — | — | .021 |
| CO, vol. % | — | — | 0.894 |
| Total CH$_3$SH, CS$_2$, COS as SO$_2$, vppm | — | — | 140 |

EXAMPLE II

The experiment described in Example I was continued for an additional 167.5 hours but with the stack gas composition altered so as to contain nitric oxide. The composition of this stack gas is shown in Table III. In this experiment, the regenerator product gas was recovered at a rate of about 2.6 scc/min, but in other respects the operating conditions and gas flow rates were as specified in Example I.

Many representative samples of both the SO$_x$-purified gas stream recovered from the absorber and the regenerator product gas stream recovered from the regenerator were taken during the 167.5 hours of the experiment and then analyzed. Average results pertaining to these gas streams are shown in Table III, and as evidenced by the data in Table III, approximately 89% of the SO$_2$ in the stack gas was removed by absorption into the liquid absorbent. In addition, samples of the absorbent solution at steady state conditions were taken and analyzed, and it was found that the absorbent had a pH of about 3.5 as it entered the absorber and about 3.3 when it left. The steady-state sulfite concentration of the absorbent entering the regenerator was 1.6 g/l (calculated as SO$_3{}^{-2}$) and less than 0.1 g/l while leaving. The sulfate concentration was about 6.0 g/l (calculated as SO$_4{}^{-2}$) as it entered the regenerator and 3.5 g/l as it left and was increasing in the system at an average rate of 0.02 g/l per hour.

Based on the foregoing, it was concluded that the conversion of dissolved SO$_2$ in the absorbent as it passed through the regenerator was as follows: a 75.0% conversion to sulfur (later determined to be essentially pure rhombic sulfur), 23.7% conversion to sulfate ions, and a 1.3% conversion to H$_2$S.

TABLE III

| | GAS STREAM COMPOSITIONS | | |
|---|---|---|---|
| Gas Component | Simulated Stack Gas | SO$_x$-Purified Gas | Regenerator Product Gas |
| SO$_2$, vppm | 2100 | 227 | 100 |
| NO$_x$, vppm | 546[1] | 483 | — |
| O$_2$, vol. % | 3.4 | 3.40 | — |
| CO$_2$, vol. % | 14.0 | 13.92 | 96.509 |
| N$_2$, vol. % | 82.35 | 82.61 | 1.354 |
| H$_2$S, vol. % | — | — | 0.946 |
| H$_2$, vol. % | — | — | 0.005 |
| CH$_4$, vol. % | — | — | 0.012 |
| CO, vol. % | — | — | 1.152 |
| Total CH$_3$SH, CS$_2$, COS as SO$_2$, vppm | — | — | 120 |

[1] The NO$_x$ components of the simulated stack gas were present largely as NO, with only a trace—10 vppm or less—present as NO$_2$.

NO$_x$ REMOVAL

Thus far it has been shown how the stack gas of line 1 containing both SO$_x$ and NO$_x$ components can be treated for SO$_x$ removal. It is, however, a further object of the invention to remove the NO$_x$ components contained in the stack gas, and this object is in part accomplished in absorber 2. Some NO$_x$ components, and particularly NO$_2$, are readily soluble in the absorbent traversing absorber 2. As a result, partial NO$_x$ removal is effected in absorber 2, and the NO$_x$ components so removed are converted to elemental nitrogen, either in absorber 2 or regenerator 15. Some absorbed NO$_x$ components are believed to react in absorber 2 with sulfite ion, producing elemental nitrogen and sulfate ion, with the nitrogen being discharged as a component of the SO$_x$-purified gas stream of line 4 and the sulfate ion being reducible to hydrogen sulfide in regenerator 15 under severe conditions. The remaining absorbed NO$_x$ components, usually in the form of nitrate or nitrite ions, are converted to elemental nitrogen in regenerator 15 under relatively mild temperature conditions, with temperatures above 180° F., and usually between 180° and 200° F. being suitable. Nitrogen produced by reduction of nitrate and/or nitrite ions in regenerator 15 is recovered as a component of the non-condensable gases discharged through vent valve 17.

Despite the removal of some NO$_x$ components in absorber 2, most of the NO$_x$ components contained in the stack gas of line 1 will be recovered as a component of the SO$_x$-purified gas stream in line 4. The reason for this is that the NO$_x$ components in stack gas are largely in the form of NO, which is only sparingly soluble in the preferred aqueous absorbent used in absorber 2. It is, therefore, necessary to further treat the SO$_x$-purified gas stream recovered from absorber 2, and, accordingly, this gas stream is directed by line 4 to absorber 32, which absorber 32 may be similar or different in construction to absorber 2 but is preferably such that sufficient contact time is provided for the NO$_x$ components introduced therein to dissolve fully in the absorbent traversing absorber 32. A product gas will be obtained from absorber 32 by line 33 of reduced NO$_x$ and SO$_x$ content, with overall efficiency for both NO$_x$ and SO$_x$ removal by passage of the stack gas successively through absorbers 2 and 32 usually being over 85% complete, and more usually still, over 90% complete.

The absorbent fed into absorber 32 is different from that of absorber 2 and preferably comprises a NO$_x$-reactive metal-containing cation in chelated form, with vanadium in the form of vanadyl ion and iron in the form of ferrous ion being the preferred metal-containing cations, especially in combination. The preferred absorbent comprises a water-soluble ferrous chelate, such as Fe(II)EDTA (ferrous ion chelated by ethylenediaminetetraacetic acid) or Fe(II)HEDTA (ferrous ion chelated by N(hydroxyethyl)-ethylenediaminetriacetic acid). The ferrous chelate entering the absorber is usually present in the absorbent in a concentration between about 0.001 and 1.0 molar, preferably between about 0.1 to 0.25 molar, with the chelant preferably provided in excess, usually in a molar concentration 1.1 to 6.0 times that of the total iron content. Ferrous chelates are highly effective for removing NO from gas streams, most probably by the direct chemical reaction:

$$NO + Fe(II)EDTA \rightarrow NO.Fe(II)EDTA \quad \text{(Adduct)} \qquad (XVIII)$$

In addition, however, some of the iron(II) chelate may react with oxygen, if present in the gas recovered from line 4, to yield an iron(III) chelate, such as Fe(III- )EDTA (ferric ion chelated by ethylenediaminetetraacetic acid).

The fresh absorbent fed to absorber 32 via lines 38 and 39 may be prepared, for example, by dissolving an alkali metal salt of EDTA or HEDTA and a water-soluble iron salt, such as iron sulfate or iron formate, in an aqueous medium, and preferably in an aqueous medium containing sufficient formic acid to maintain the pH of the fresh absorbent below 7.0, usually between about 1 and 6, and preferably between about 3.0 and 5.5. The preferred fresh absorbent may be prepared with either ferric or ferrous formate. If ferrous formate is chosen, then the iron(II) chelate needed to remove $NO_x$ readily forms; if ferric formate, then ferric chelate forms, which is easily reduced to the necessary ferrous chelate during regeneration of the spent absorbent, which regeneration will be explained more fully hereinafter.

It is most highly preferred when operating absorber 32 for removal of NO from a gas stream in line 4 which also contains oxygen that, on an hourly basis, for every mole of NO entering the absorber via line 4, the amount of ferrous chelate entering via line 39 is more than 1 but less than about 20 moles, and preferably between about 10 and 15 moles. Somewhat surprisingly, operating in this manner, as opposed to operating with a 50-to-1 or 100-to-1 molar ratio as conventionally practiced in many NO-absorbers using a ferrous chelate absorbent, results in increased removals of NO. This strange result—where 10 to 15 moles of ferrous chelate proves more effective than 100 moles—is believed due to a complex series of chemical reactions involving the formation of an oxygen-ferrous chelate adduct, which reacts with the NO-ferrous chelate adduct, releasing NO and producing ferric chelate.

It is also preferred in operating absorber 32 that the temperature utilized therein be maintained below about 150° F., preferably between 120° and 140° F., and most preferably at 130° F. Under such temperature conditions, the $NO_x$ removal in absorber 32 is highly efficient, allowing for the use of very low liquid-to-gas ratios while obtaining a product gas by line 33 carrying, on a mass-per-hour basis, less than 15%, usually less than 10%, of the amount of $NO_x$ carried with gases entering absorber 32 through line 4.

Spent absorbent recovered from absorber 32 by line 34 contains dissolved NO, presumably as an adduct with the iron chelate, and further contains whatever ferric chelate is fed as makeup through line 38 plus any ferric chelate produced by reaction with oxygen in absorber 32. The spent absorbent is directed by pump 35 through pipe 36 to heat exchanger 40 and heated by indirect heat exchange with heated, regenerated absorbent. The absorbent is then passed by conduit 41 to heater 42, wherefrom a heated spent absorbent is obtained in line 43 at a temperature usually of at least about 240° F., and most preferably between 225° and 285° F. To the heated absorbent is added an aqueous solution containing dissolved formic acid through line 44, and the resulting mixture is then fed by pipe 45 into regenerator 46.

In regenerator 46, the spent absorbent solution, now containing added formate ion and having an acid pH is regenerated back to its active form. This is accomplished by contact of the solution at a pressure at least sufficient to prevent the absorbent from boiling and at a temperature usually between about 240° and 350° F. with a water-insoluble, solid substance containing one or more tertiary amine (a valence state 3 nitrogen atom bonded only to carbon atoms) functional groups, with said functional groups preferably having anion-exchange capacity and being ion-exchanged to contain formate ion in at least some of the ion-exchange sites. Preferably, a water-insoluble, anionic, organic, ion-exchange resin containing tertiary amine functional groups, such as that marketed by Rohm & Haas Company under the trade name of Amberlyst A-21 is utilized. Although the exact composition of this resin is not available to the public, it is known that Amberlyst A-21 is a water-insoluble organic resin of macroreticular structure comprising a copolymer of a substituted styrene and divinylbenzene and containing weakly basic, tertiary amine functional groups, with essentially all of the anion exchange capacity residing in said tertiary amine functional groups. It is further known that Amberlyst A-21 is stable in regenerator 46 at the most preferred operating temperatures of 255° to 285° F., and that, when treated to contain formate ions at the ion exchange sites, it has catalytic activity for regenerating the spent absorbent to a form active for absorbing NO. Hence, when initially charged to regenerator 46, the Amberlyst A-21 resin particles are preferably ion-exchanged to contain the formate ion by pretreatment with hot formic acid under an inert or reducing atmosphere. In non-preferred embodiments, however, the resin may be pretreated by ion exchange with a slat of formic acid, such as sodium formate, or the resin may simply be converted to the active form in situ, e.g., by adding sufficient formic acid via line 44 and valve 55 to activate the resin during regeneration. In all embodiments, however, it is preferred that formate ions occupy at least 50%, and preferably essentially all, of the anionic ion-exchange sites.

In choosing a resin for use in regenerator 46, it is most highly preferred that the resin contain essentially no primary or secondary amines, especially if such primary or secondary amines contribute to the anion-exchange capacity of the resin. It is believed that Amberlyst A-21 resin contains essentially no primary or secondary amines and that one of the reasons it is highly active for the chemical reactions required in regenerator 46 is that it is free or essentially free of primary and secondary amines, which are not catalytically active for purposes herein. The number of quaternary amines in the resin should also be relatively low due to their strongly basic characteristics. Amberlyst A-21 has some quaternary amines but not enough to alter the weakly basic characteristics of the resin.

As an alternative to Amberlyst A-21 resin, it is a specific embodiment of the invention to utilize an organic resin comprising a copolymer of divinylbenzene, styrene, and a vinylpyridine, such as 2-vinylpyridine or 4-vinylpyridine, or a substituted vinylpyridine, such as 2-methyl-5-vinylpyridine. A method by which one such organic resin is prepared is by heating at 50° C. for one day a mixture composed of 75 parts by weight 2-methyl-5-vinylpyridine, 22 parts styrene, 3 parts divinylbenzene, 5 parts of a sodium fatty acid soap, 180 parts water (deionized), 0.3 parts by weight mixed tert-mercaptans, and 0.3 parts by weight potassium persulfate, following which the copolymer product is separated by conventional means from unreacted ingredients and dried. Another method is similar to the foregoing except that 75 parts of 4-vinylpyridine are utilized instead of 2-methyl-5-vinylpyridine and 0.3 parts of benzoyl peroxide is utilized in place of the potassium persulfate.

Although the invention is not limited to any particular theory of operation, it is believed that the chemical reactions resulting in the conversion of the spent absorbent solution back to its active form in regenerator 46 are believed to include:

$$2NO\cdot Fe(II)EDTA + 2HCO_2H \rightarrow 2Fe(II)EDTA + N_2 + 2CO_2 + 2H_2O \qquad (XIX)$$

$$2Fe(III)EDTA + HCO_2H \rightarrow 2Fe(II)EDTA + CO_2 + 2H^+ \qquad (XX)$$

Conditions employed in regenerator 46 to obtain high conversions of dissolved $NO_x$ components to elemental nitrogen and also of ferric chelate to ferrous chelate may be found in the following ranges: 240° to 350° F., preferably 250° to 300° F., 0.2 to 5.0 LHSV, preferably 0.5 to 2.0 LHSV, and 35 to 200 psia, preferably 50 to 100 psia. Conditions known to provide for a regenerated absorbent useful on a continuous basis for removing over 90% of the $NO_x$ entering absorber 32 when regenerator 46 contains formate ion-exchanged Amberlyst A-21 resin, and when sufficient formic acid is added for Reactions (XIX) and (XX), and preferably when at least 15% excess formic acid is used, are: 280° F., 60 psia, and 0.667 LHSV.

Operation under the foregoing conditions has also been found to result in the conversion of at least 90% of the ferric chelates in the spent absorbent to ferrous chelates. At stated previously, ferric chelates may be present in the spent absorbent by the reaction of ferrous chelates with oxygen in absorber 32 or by the deliberate addition of iron(III) chelates through line 38. Iron(III) chelate is not active for removing NO, and, accordingly, when NO is to be removed, iron(III) chelate must be reduced to iron(II) chelate in regenerator 46. A highly convenient visual method for determining if the regenerated absorbent is sufficiently regenerated for purposes of NO absorption is by the color of the regenerated absorbent. Since iron(II) chelates are almost colorless, while most iron(III) chelates exhibit noticeable color, usually a brownish-red color in acidic media, the regenerated absorbent removed from separator 48 must either be almost colorless or exhibit a lighter color than the spent absorbent in line 34. Most usually, the regenerated absorbent will evince some color, usually a pale amber color, since the conversion of ferric chelate to ferrous chelate is usually not 100% complete. Thus, the preferred method of operation with iron chelate-containing absorbents results in the conversion of a spent absorbent of a relatively dark color to a regenerated absorbent exhibiting only a tinge of color, and the difference in color between the two liquids provides a quick indication that the regenerated absorbent is active for absorbing NO.

After treatment in regenerator 46, a regenerated absorbent is recovered in line 47 and introduced into liquid-gas separator 48 where elemental nitrogen, carbon dioxide, carbon monoxide, and any other gases produced in regenerator 46 are separated from the regenerated absorbent and discharged to atmosphere by line 49. The regenerated absorbent, usually at a pH between 4.0 and 6.0, is then recycled by lines 50 and 51, preheater 40, and lines 37 and 39 to absorber 32.

To prevent excessive build-up of undesirable constituents in the circulating absorbent, a bleed is provided in the form of line 52 and valve 53. Under steady-state conditions, the amount of absorbent necessary to be bled by line 52, and therefore the equivalent amount of make-up necessary to be fed by line 38 through valve 54, will be small, certainly in comparison to that withdrawn from the $SO_x$ absorber-regenerator system by line 24. This is due to the far slower increase in concentration of insoluble constituents. Because of the extremely high conversions of dissolved $NO_x$ components to elemental nitrogen in regenerator 46, the concentration of dissolved nitrogen components can easily be maintained at soluble levels. Neither do undesirable nitrogen-containing components, such as ammonium ion, form in the absorbent solution. Thus, the bleed rate through line 52 will be small, usually being only that required to maintain the solubility of whatever trace amounts of $SO_x$ constituents in line 4 dissolve in the absorbent of absorber 32. The bleed through line 52 may also have to be increased to prevent the formation of insoluble iron oxalates, but such formation may be prevented without a bleed, as by using an excess of chelating agent and/or decreasing the proportion of ferrous chelate in the absorbent with other metal chelates effective for absorbing NO. This may be accomplished, for example, as in the preferred embodiment, by adding vanadium in the form of vanadyl cation plus a chelating agent. Other chelated cations which may be used include those of chromium, copper, cobalt, manganese, and nickel, although their effects on the solubility of dissolved constituents may not be as favorable as is the case for vanadium. (In less preferred embodiments of the invention, iron chelates may be removed entirely from the $NO_x$ absorbent circulating through absorber 32 and regenerator 46 and replaced with a chelate of a cation of copper, manganese, cobalt, vanadium, nickel, or chromium, with metal concentrations between 0.001 and 1.0 moles per liter usually being effective. However, these metals are not as effective as iron for absorbing and releasing $NO_x$ compounds under the conditions employed in absorber 32 and regenerator 46, respectively, and, therefore, in the preferred embodiment of the invention, at least some iron chelate is utilized, most preferably in combination with a vanadium cation in chelated form, such as a vanadyl ion chelate of EDTA or HEDTA.)

The following Examples illustrate a method for removing NO from an essentially $SO_x$-free gas stream by absorption and subsequently regenerating the absorbent in the presence of formate ion-exchanged Amberlyst A-21 resin. The Examples do not limit the scope of the invention, which is defined by the claims.

EXAMPLE III

A $SO_x$-free gas stream having a typical composition as shown in Table IV was passed at a pressure slightly greater than atmospheric into a laboratory-sized absorber at the rate of 890 scc/min (scc referring herein to the calculated volumetric gas rate at 1 atm. and 60° F.). The internal dimensions of the absorber were 2.0 inches I.D. by 3 feet, thereby providing a 1853 cc absorption zone, of which about 741 cc was occupied with ¼ inch ceramic Berl saddles. The absorber was operated at a temperature of about 130° F., and the $SO_x$-free gas was passed upwardly in countercurrent flow with an aqueous liquid absorbent passing through the absorber at 200 ml/hr. The absorbent initially had a pH between 4.8 and 5.0 and consisted essentially of an aqueous solution containing formic acid in a 4.0 molar concentration, ferrous formate in a 0.17 molar concentration, vanadyl sulfate in a 0.03 molar concentration, and HEDTA in a 1.0 molar concentration (using the tri-sodium salt of N-(hydroxyethyl)ethylenediaminetriacetic acid).

Spent absorbent recovered from the absorber was passed into a regenerator comprising a steam-jacketed isothermal liquid upflow reactor. The reactor contained 230 grams of Amberlyst A-21 weakly basic anion-exchange resin with tertiary amine functionality, said resin having a 45% moisture content and a 16-50 mesh particle size. The volume of the reactor was approximately 1.0 liters, and the operating conditions maintained therein were 280° F. and 68 psia. Concentrated formic acid (98% by weight) was continually added at the rate of 1.1 ml/hr to the spent absorbent solution entering the regenerator. The regenerated solution exited the top of the regenerator and entered a gas-liquid separator wherein a regenerator product gas was recovered at a rate of about 11.0 scc/min while regenerated absorbent was recovered and blended with sufficient water to recycle a stream of regenerated absorbent to the absorber at a rate of 200 ml/hr. Make-up water was added to the absorber as necessary to balance the amount of water that was lost due to evaporation.

The above-described experiment was performed over a 1,040-hour time period, and many representative samples of both the $NO_x$-purified gas stream recovered from the absorber and the regenerator product gas stream were taken between the 915th and 1,040th hours of the experiment, and then analyzed, with average results pertaining to these gas streams being shown in Table IV. As the data in Table IV reveal, approximately 94.2% of the $NO_x$ in the stack gas was removed by absorption in the liquid absorbent. In addition, samples of the absorbent solution at steady-state conditions were taken and analyzed, and it was found that the absorbent had a pH of about 4.8 as it entered the absorber and about 5.0 when it left. Of a total iron concentration in the process solution of 6.3 g/l (0.11 molar), 42.7% was present as the active ferrous ion upon entering the regenerator, and 92.8% was present as active ferrous ion when leaving the regenerator. The absorbent was also analyzed for nitrite, nitrate, and ammonia during the run, but none was ever found in either the absorbent entering or leaving the regenerator.

TABLE IV

| Gas Component | GAS STREAM COMPOSITIONS | | |
|---|---|---|---|
| | $SO_x$-free Gas | $NO_x$ Purified Gas | Regenerator Product Gas |
| $SO_2$, vppm | 0 | 0 | 0 |
| $NO_x$, vppm | 552[1] | 32 | 0 |
| $O_2$, vol. % | 3.40 | 3.40 | 0 |
| $CO_2$, vol. % | 14.00 | 13.93 | 33.84 |
| $N_2$, vol. % | 82.54 | 82.66 | 0.64 |
| CO, vol. % | 0 | 0 | 63.12 |
| $H_2$, vol. % | 0 | 0 | 2.40 |

[1]The $NO_x$ components of the $SO_x$-free gas were present largely as NO, with only a trace—10 vppm or less—present as $NO_2$.

Based on the foregoing regenerator product gas analysis and that for the $NO_x$-purified gas, and also on the respective volumetric rates of these gas streams, it would appear that some of the absorbed NO is converted in the absorber to elemental nitrogen, perhaps by Reaction (XIX). The remainder is converted to elemental nitrogen in the regenerator, along with the conversion of the inactive ferric chelate to ferrous chelate.

EXAMPLE IV

The experiment described in Example III was continued for an additional 139 hours but the $NO_x$-containing gas entering the absorber was altered so as to contain $SO_2$. This feed gas, having a typical composition as shown in the first column of Table V, was similar in composition to the $SO_x$-purified gas produced in the experiment described in Example II, and thus, the data obtained in the present experiment reflect the overall performance of the invention for treating a stack gas composition containing $SO_2$ and NO in the concentrations shown in Table III.

The operating conditions of the present experiment were similar to those of Example III except that (1) the initial iron concentration of the absorbing solution was 0.13 molar, (2) concentrated formic acid was added at the rate of 1.6 ml/hr, and (3) the regenerator product gas was recovered at the rate of 10.5 scc/min. The efficiencies of removal of $SO_2$ and NO in the iron chelate-containing absorbent were 90.9% and 97.6%, respectively, as evidenced by the data in Table V.

TABLE V

| Gas Component | GAS STREAM COMPOSITIONS | |
|---|---|---|
| | Simulated $SO_x$-Purified Gas | Absorber Product Gas |
| $SO_2$, vppm | 210 | 19 |
| $NO_x$, vppm | 497[1] | 12 |
| $O_2$, vol. % | 3.40 | 3.40 |
| $CO_2$, vol. % | 14.00 | 13.93 |
| $N_2$, vol. % | 82.53 | 82.67 |

[1]The $NO_x$ components of the $SO_x$-purified gas were largely present as NO, with only a trace—10 vppm or less—of $NO_2$.

Based on the data in Tables III and V, it can be seen that the passage of a stack gas containing 2100 vppm $SO_2$ and 546 vppm NO through a first absorber designed primarily for $SO_x$ removal and a second absorber designed primarily for $NO_x$ removal results in a product gas containing only 19 vppm $SO_2$ and 12 vppm NO. These results indicate an overall efficiency for $SO_x$ and $NO_x$ removal of at least 95%, with the $SO_2$ removal being greater than 99% and the NO removal being greater than 97%.

In addition, the present invention provides several advantages over a process designed for simultaneous removal of both $SO_x$ and $NO_x$ components in a single absorbent solution containing formate ion and ferrous chelate. In a single-stage process operated in a manner similar to that of Example II hereinbefore but containing ferrous chelate in a 0.32 molar concentration, it was found that, although the process was effective for removing $SO_x$ and $NO_x$ components, the conversions of dissolved $SO_x$ components to elemental sulfur and hydrogen sulfide were only 34.9% and 13.8% effective, respectively. The majority of the dissolved $SO_x$ compounds—51.3%—was converted to sulfate ion, an ion which proves extremely difficult to reduce during regeneration of spent solution. In contrast, operating in accordance with the invention yields, as shown in Example II hereinbefore, a 75% conversion to elemental sulfur in regenerator 15—a yield more than twice as great as that obtained with ferrous chelate in the absorbent of absorber 2. Hence, by comparison to single-stage operation, the present invention is not only highly efficient for both $SO_x$ and $NO_x$ removal but is also much more efficient for the conversion of dissolved $SO_x$ components to elemental sulfur. This result indicates that the rate at which absorbent must be bled by line 24 and disposed to waste is far less than that required for single-stage operation.

Although the invention has been described in conjunction with a preferred embodiment thereof, it is apparent that many alternatives, modifications, and variations of the invention are contemplated. For example, the absorbent composition in either absorber 2 or 32 may, in non-preferred embodiments, be non-aqueous rather than aqueous. Among such non-aqueous absorbents are the high boiling polyhydric alcohols, especially glycols. However, it must be cautioned that the possibility of forming potentially organo-nitro compounds does exist when such alcohols are used, and, for that reason, their use must be undertaken only under carefully controlled conditions. In another embodiment of the invention, oxalic acid is employed instead of formic acid in the absorbent traversing absorber 2. In this embodiment, increased operational difficulties will ensue due to the corrosiveness of oxalic acid and its increased tendency to form oxalate salt precipitates. The formation of such precipitates, however, may be minimized by adding a chelating agent (e.g., EDTA or HEDTA) to the absorbent in absorber 2. In yet another alternative embodiment of the invention, the resin utilized in regenerator 46 may be eliminated, provided the liquid absorbent circulating through absorber 32 and regenerator 46 contains the reaction product of formic acid or oxalic acid and an alkanolamine containing a tertiary amine functional group. In this embodiment of the invention, therefore, the absorbent in absorber 32 contains the same ingredients as described hereinbefore with respect to absorber 2 plus an iron and/or other metal chelate introduced in an amount as described hereinabove with respect to the absorbent in absorber 32. Spent absorbent removed from absorber 32, containing both added metal chelate and the reaction product, is regenerated in regenerator 46 in the presence of formate ion—or even oxalate ion—added via line 44 in amounts effective for converting the dissolved $NO_x$ compounds to elemental nitrogen and the metal chelate to an active form (e.g., ferric chelate to ferrous chelate). Regeneration is accomplished merely by subjection of the spent absorbent to an elevated temperature above about 125° F., preferably above about 175° F., and most preferably at an elevated temperature between about 240° and 350° F. It is intended to embrace within the invention these and all other embodiments falling within the spirit and scope of the appended claims.

We claim:

1. A process for treating a feed gas comprising $NO_x$ and $SO_x$ components, which process comprises:
   (1) contacting said feed gas with a first liquid comprising the reaction product of formic acid or oxalic acid with one or more alkanolamines containing a tertiary amine functional group under conditions such that the $SO_x$ content of said feed gas is decreased;
   (2) subjecting said first liquid after said contacting in step (1) to conditions, including an elevated temperature and the presence of added formate ion, such that a sulfur component selected from the group consisting of elemental sulfur, hydrogen sulfide, and a mixture thereof forms;
   (3) separating said sulfur component from said first liquid;
   (4) contacting the gas of decreased $SO_x$ content produced in step (1) with a second liquid comprising a $NO_x$-reactive metal-containing ion in chelated form under conditions such that the $NO_x$ content of said gas is decreased and the concentration of nitrogen components in said second liquid increases;
   (5) contacting the second liquid after said contacting in step (4) with a solid substance containing one or more tertiary amine functional groups under conditions, including an elevated temperature and pressure and the presence of added formate ion, such that the concentration of nitrogen components in said second liquid decreases; and
   (6) withdrawing a product gas from step (4) of reduced $SO_x$ and $NO_x$ content in comparison to the feed gas.

2. A process as defined in claim 1 wherein said feed gas also contains $O_2$.

3. A process as defined in claim 1 wherein the temperature maintained in step (1) is below 160° F., in step (2) above 175° F., in step (4) below 150° F., and in step (5) above 240° F.

4. A process as defined in claim 3 wherein said feed gas contains $O_2$ and a ferrous chelate is utilized in step (4), some of which is converted to ferric chelate under the conditions of step (4), and wherein a substantial proportion of said ferric chelate is converted in step (5) to ferrous chelate.

5. A process as defined in claim 4 wherein the molar ratio in step (4) of ferrous chelate in the second absorbent to NO in said gas of decreased $SO_x$ content is between 1 and 20.

6. A process as defined in claim 4 wherein said solid substance in step (5) comprises an organic anion exchange resin containing tertiary amine functional groups, with at least some of said ion exchange capacity being associated with said tertiary amine functional groups and with formate ion being present in at least some of the ion exchange sites associated with said tertiary amine functional groups.

7. A process as defined in claim 6 wherein said first and second liquids contain formate ions in steps (1) and (4), respectively.

8. A process as defined in claim 1, 2, 3, 4, 5, 6, or 7 wherein said first and second liquids are aqueous.

9. A process as defined in claim 8 wherein said second liquid contains a NO-reactive metal cation of manganese, copper, chromium, vanadium, cobalt, or nickel in chelated form.

10. A process for treating a feed gas stream comprising $NO_x$ and $SO_x$ components, which process comprises:
    (1) introducing said feed gas stream into a first absorption zone wherein said feed gas stream contacts a first absorbent comprising an aqueous liquid to which has been added formic acid or a precursor thereof and one or more alkanolamines containing a tertiary amine functional group, or a precursor thereof, under conditions such that $SO_x$ components are absorbed from said feed gas stream into said first absorbent, thereby producing a gas stream of reduced $SO_x$ content;
    (2) regenerating a spent absorbent stream removed from step (1) by subjecting said spent absorbent stream to conditions, including an elevated temperature and the presence of added formate ion, such that a sulfur component selected from the group consisting of elemental sulfur, hydrogen sulfide, and mixtures thereof is formed;

(3) separating said sulfur component from the regenerated absorbent stream produced in step (2) and recycling said first regenerated absorbent to step (1);

(4) introducing the gas stream of reduced $SO_x$ content produced in step (1) into a second absorption zone wherein said gas stream of reduced $SO_x$ content is contacted with a second absorbent comprising an aqueous liquid containing a ferrous chelate under conditions such that $NO_x$ components are absorbed into said second liquid absorbent;

(5) regenerating a spent absorbent stream removed from step (4) by contacting said spent absorbent stream, under conditions of elevated pressure and a temperature above about 240° F., and in the presence of added formate ion, and further in the presence of sufficient hydrogen ions to provide an acid pH, with an organic anion exchange resin containing weakly basic tertiary amine functional groups, said resin containing formate ion in at least some of the ion exchange sites;

(6) recycling regenerated absorbent produced in step (5) to step (4) and withdrawing a product gas from step (4) of decreased $SO_x$ and $NO_x$ content in comparison to said feed gas stream.

11. A process as defined in claim 10 wherein the alkanolamine added to said first absorbent boils above about 300° F. under atmospheric conditions.

12. A process as defined in claim 10 wherein said second absorbent further contains vanadyl cations.

13. A process as defined in claim 10 wherein the pH of both the first and second absorbent compositions is below 7.0.

14. A process as defined in claim 11, 12 or 13 wherein said feed gas stream also contains oxygen.

15. A process as defined in claim 14 wherein some of the ferrous chelate in step (4) is converted to ferric chelate and subsequently a substantial proportion of said ferric chelate is converted back to ferrous chelate in step (5).

16. A process as defined in claim 15, wherein the temperature maintained in step (1) is below 160° F., in step (2) above 175° F., in step (4) below 150° F., and in step (5) above 240° F.

17. A process as defined in claim 16 wherein said resin in step (5) is of macroreticular structure and comprises a copolymer of a substituted styrene and divinylbenzene.

18. A process as defined in claim 16 wherein said resin in step (5) comprises a copolymer of 4-vinylpyridine and divinylbenzene.

19. A process as defined in claim 16 wherein essentially all of the anion exchange capacity of the resin in step (5) is associated with said tertiary amine functional groups.

20. A process for treating a feed gas stream comprising NO and $SO_2$, which process comprises:

(1) contacting said feed gas stream with a first acidic absorbent composition comprising an aqueous liquid containing the reaction product of formic acid and an alkanolamine containing a tertiary amine functional group under conditions such that at least some of said $SO_2$ is absorbed into said absorbent, thereby producing a purified gas stream of reduced $SO_2$ content;

(2) regenerating absorbent withdrawn from step (1) by admixing formic acid therewith and heating the resulting admixture to a temperature sufficient to produce elemental sulfur;

(3) separating the products of step (2) into a regenerated first absorbent, elemental sulfur, and a $CO_2$-containing gas;

(4) recycling the regenerated first absorbent obtained in step (3) to step (1);

(5) contacting the purified gas stream produced in step (1) with a second acidic absorbent composition comprising an aqueous liquid containing a ferrous chelate under conditions such that NO is absorbed into said second absorbent and a product gas of reduced $SO_2$ and NO content in comparison to said feed gas is produced;

(6) regenerating absorbent withdrawn from step (5) by admixing formic acid therewith and contacting the resultant mixture with a water-insoluble, anionic ion exchange resin containing tertiary amine functional groups and containing formate ion in at least some of the ion exchange sites, said contacting being such that a gas comprising elemental nitrogen is produced;

(7) separating said gas comprising elemental nitrogen from a regenerated absorbent containing a ferrous chelate;

(8) recycling the regenerated absorbent obtained in step (7) to step (5); and (9) withdrawing from step (5) the product gas of reduced $SO_2$ and NO content.

21. A process as defined in claim 20 wherein said first absorbent is prepared by adding formic acid or precursors thereof and an alkanolamine containing a tertiary amine functional group, or precursors thereof, to an aqueous liquid.

22. A process as defined in claim 20 wherein said alkanolamine added to said aqueous liquid in step (1) boils above 400° F. under atmospheric conditions.

23. A process as defined in claim 20 wherein said second absorbent composition also contains added vanadyl cations.

24. A process as defined in claim 20 wherein the concentration of ferrous chelate in step (5) in the second absorbent composition is between 0.001 and 1.0 molar.

25. A process as defined in claim 21, 22, 23, or 24 wherein a substantial proportion of the anion exchange capacity of the resin in step (6) is associated with said tertiary amine functional groups, with formate ion being present in at least some of the ion exchange sites associated with said functional groups.

26. A process as defined in claim 25 wherein the temperature maintained in step (1) is below 150° F., in step (2) during said heating above 185° F., in step (5) between about 120° and 140° F., and during said contacting of step (6) above 255° F.

27. A process as defined in claim 21, 22, 23, or 24 wherein $O_2$ is also present in said feed gas stream, and wherein some of the ferrous chelate in step (5) is converted to ferric chelate, which is then converted back to ferrous chelate in step (6).

28. A process as defined in claim 27 wherein the pH of the mixture of NO-containing absorbent and formic acid in step (6) prior to said contacting in step (6) is between about 3.5 and about 5.5.

29. A process as defined in claim 28 wherein the absorbent composition in step (1) initially has a pH between 2.5 and 6.5 and contains said alkanolamine in a concentration between 1 and 3 molar.

30. A process as defined in claim 27 wherein the molar ratio of ferrous chelate in said second absorbent composition to NO in the purified gas stream in step (5) is between 10 and 15 to 1.

31. A process as defined in claim 20, 21, 22, 23, or 24 wherein said second acidic absorbent composition comprises formate ion.

32. A process as defined in claim 27 wherein the pH of the withdrawn absorbent in step (2) is no more than 1.5 pH units lower than that of the absorbent in step (1) prior to said contacting.

33. A process for treating a feed gas stream comprising NO and $SO_2$, which comprises:
  (1) introducing said feed gas stream into a $SO_2$ absorption zone wherein said feed gas stream contacts at a temperature below 160° F. an acidic $SO_2$-absorbent comprising an aqueous liquid to which has been added formic acid or precursors thereof and one or more alkanolamines selected from the group consisting of methyldiethanolamine, triethanolamine, and triisopropanolamine, said contacting being under conditions such that at least 85% of the $SO_2$ in said feed stream is absorbed into said $SO_2$-absorbent, thereby producing a $SO_2$-purified gas stream;
  (2) admixing formic acid with a stream of spent $SO_2$-absorbent withdrawn from step (1);
  (3) subjecting the mixture produced in step (1) to conditions of elevated temperature above about 175° F. such that elemental sulfur, a $CO_2$-containing gas, and a regenerated $SO_2$-absorbent are produced;
  (4) separating said elemental sulfur, $CO_2$-containing gas, and said regenerated $SO_2$-absorbent, and recycling said regenerated $SO_2$-absorbent to step (1);
  (5) introducing the $SO_2$-purified gas stream produced in step (1) into a NO-absorption zone wherein said $SO_2$-purified gas stream contacts an acidic NO-absorbent comprising an aqueous liquid containing ferrous ion chelated with ethylenediaminetetraacetic acid or N(hydroxyethyl)ethylenediaminetriacetic acid, said contacting being under conditions, including a temperature below 140° F., such that at least 85% of the NO contained in said $SO_2$-purified gas stream is absorbed into the NO-absorbent;
  (6) admixing formic acid with a stream of spent NO-absorbent withdrawn from step (5);
  (7) contacting the mixture produced in step (6) with an organic anion exchange resin of macroreticular structure comprising a copolymer of a substituted styrene and divinylbenzene and containing weakly basic tertiary amine functional groups, with a substantial proportion of the anion exchange capacity being associated with said tertiary amine functional groups, and with formate ion being contained in at least some of the ion exchange sites associated with said tertiary amine functional groups, said contacting with said resin being at an elevated temperature above 255° F. and an elevated pressure above 35 psia such that a substantial proportion of the NO contained in said mixture is converted to elemental nitrogen.
  (8) separating the products of step (7) into a gas stream containing elemental nitrogen and a regenerated NO-absorbent, which regenerated NO-absorbent is recycled to step (5); and
  (9) withdrawing from step (5) a product gas stream carrying, on a mass basis, less than 15% of the $SO_2$ and NO as were contained in said feed gas stream.

34. A process as defined in claim 33 wherein said NO-absorbent contains formate ion.

35. A process as defined in claim 33 wherein oxygen is present in said feed gas stream and some of said chelated ferrous ion in step (5) is converted to chelated ferric ion, with a substantial proportion of said chelated ferric ion being converted back to chelated ferrous ion in step (7).

36. A process as defined in claim 33, 34, or 35 wherein said elevated temperature in step (3) is no greater than about 300° F.

37. A process for treating a feed gas comprisng $NO_x$ and $SO_x$ components, which process comprises:
  (1) contacting said feed gas with a first liquid comprising the reaction product of formic acid or oxalic acid with one or more alkanolamines containing a tertiary amine functional group under conditions such that the $SO_x$ content of said feed gas is decreased;
  (2) subjecting said first liquid after said contacting in step (1) to conditions, including an elevated temperature and the presence of added formate ion, such that a sulfur component selected from the group consisting of elemental sulfur, hydrogen sulfide, and a mixture thereof forms;
  (3) separating said sulfur component from said first liquid;
  (4) contacting the gas of decreased $SO_x$ content produced in step (1) with a second liquid comprising a $NO_x$-reactive metal-containing ion in chelated form plus the reaction product of formic acid or oxalic acid with one or more alkanolamines containing a tertiary amine functional group under conditions such that the $NO_x$ content of said gas is decreased and the concentration of nitrogen components in said second liquid increases;
  (5) subjecting said second liquid after said contacting in step (4) to conditions, including an elevated temperature and the presence of added formate or oxalate ions, such that the concentration of nitrogen components in said second liquid decreases; and
  (6) withdrawing a product gas from step (4) of reduced $SO_x$ and $NO_x$ content in comparison to the feed gas.

38. A process as defined in claim 37 wherein (a) said first and second liquids contain the reaction product of formic acid and an alkanolamine containing a tertiary amine functional group, said alkanolamine boiling above about 300° F. under atmospheric conditions, (b) said metal in said metal-containing ion in step (4) is iron or vanadium, (c) said feed gas comprises NO, $SO_2$, and $O_2$, (d) said sulfur component recovered in step (3) includes elemental sulfur, (e) said first liquid separated in step (3) and said second liquid of decreased nitrogen components' concentration in step (5) are recycled to steps (1) and (4), respectively, and (f) said conditions in step (5) include the presence of added formate ions and an elevated pressure.

39. A process as defined in claim 37 or 38 wherein the elevated temperature in step (5) is above about 240° F. and wherein the product gas carries, on a mass basis, less than 15% of the $SO_x$ and $NO_x$ as were contained in said feed gas.

40. A process as defined in claim 38 wherein the first and second liquids are aqueous and have a pH of 3.0 to 5.0 prior to said contacting in steps (1) and (4), respectively, and about 2.5 to 5.0 in steps (2) and (5) after addition of said formate ion.

41. A process as defined in claim 1, 2, 37, or 38 wherein some of said $NO_x$-reactive metal-containing ion is oxidized in step (4) to a form less active for absorbing $NO_x$ compounds but said less active forms are converted to the active form in step (5).

* * * * *